UNITED STATES PATENT OFFICE 2,673,198

POLYAZO DYESTUFFS

Philippe Grandjean and Walter Wehrli, Basel, Switzerland, assignors to Sandoz A. G., Basel, Switzerland, a Swiss firm No Drawing. Application June 20, 1951, Serial No. 232,662

Claims priority, application Switzerland June 23, 1950

12 Claims. (Cl. 260—144)

The present invention relates to new polyazo dyestuffs and to the preparation thereof.

Dyes which yield yellow, orange and brown shades in textile dyeings are known. However, these known dyes, in so far as they are characterized by good fastness to light, are bound up with poor dischargeability or, when their dischargeability is good, suffer from poor fastness to light.

A primary object of the present invention is the embodiment of a new series of dyes of the said class—yellow, orange and brown—which are characterized by the fact that, in addition to the purity of shade of the dyeings produced therewith, such dyeings possess both good fastness to light and also good dischargeability.

This and other objects which will hereinafter appear are realized by the present invention according to which, briefly stated, the desired dyestuffs are prepared by condensing 2 mols of an aminoazo dyestuff which corresponds to the formula

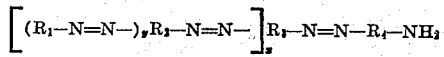

wherein each of $x$ and $y$ is one of the numerals 0 and 1, and each of $R_1$, $R_2$, $R_3$ and $R_4$ stands for a radical of the benzene or naphthalene series, which may be substituted, as for example by halogen atoms or by lower alkyl, lower alkoxy, acylamino or nitro groups, and which in toto carry at least two solubilizing groups, such as —$SO_3H$ and/or —COOH, with 1 mol of a dicarboxylic acid halide which corresponds to the formula

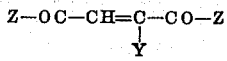

wherein Y stands for H or $H_3$, and Z stands for Cl or Br, the condensation being carried out in the presence of an acid-binding agent.

The joining together of the two molecules of aminoazo dyestuff by means of the dicarboxylic acid halide takes place preferably at room temperature (about 20° C.) in a weakly acid (acetic acid), neutral or alkaline aqueous medium. The liquid dihalide or a solution thereof in an organic solvent is added to a solution of the dyestuff in the aforesaid aqueous medium—an acid-binding agent such for example as an alkali metal hydroxide, an alkali metal carbonate, an alkaline earth metal oxide, an alkaline earth metal carbonate, an alkali metal acetate, etc., being added, if desired, at the beginning or during the course of the reaction.

Suitable dicarboxylic acid halides according to the present invention comprise the dichlorides and dibromides of fumaric acid, maleic acid, citraconic acid and mesaconic acid.

The new dyestuffs, which correspond to the general formula

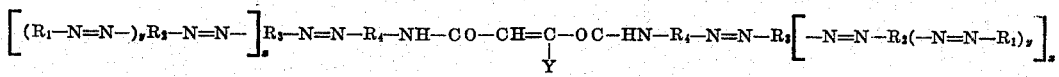

wherein each of $x$ and $y$ is one of the numerals 0 and 1, Y stands for H or $CH_3$, and each of $R_1$, $R_2$, $R_3$ and $R_4$ stands for a radical of the benzene or naphthalene series, such radicals in toto carrying at least two solubilizing groups, such as —$SO_3H$ and —COOH, and being otherwise unsubstituted or substituted by one or more halogen atoms or lower alkyl, lower alkoxy, acylamino or nitro groups, dye cotton and regenerated cellulose in pure yellow, orange or brown shades, the resultant dyeings possessing good dischargeability and good fastness to light.

The following examples set forth representative exemplary embodiments of the invention, and these examples are intended to be solely illustrative and not at all limitative. In these examples, parts are by weight.

Example 1

464 parts of the dyestuff prepared by coupling diazotized 2-aminonaphthalene-4,8-disulfonic acid with 3-acetylamino-1-aminobenzene are dissolved in water at room temperature, with addition of sodium hydroxide solution to keep the dyestuff solution neutral. Then, while stirring vigorously, a solution of 76.5 parts of fumaric acid dichloride in 80 parts of benzene and a sodium carbonate solution are added dropwise to the dyestuff solution, the sodium carbonate solution being added in sufficient amount to keep the reaction constantly weakly alkaline.

After all the fumaric acid dichloride has been added, stirring is continued until no more free amino group can be detected. Thereupon the formed dyestuff is separated out with the aid of common salt (sodium chloride) while warming slightly, and the precipitated dyestuff isolated by filtering and then dried.

It is a brownish yellow powder, which corresponds to the formula

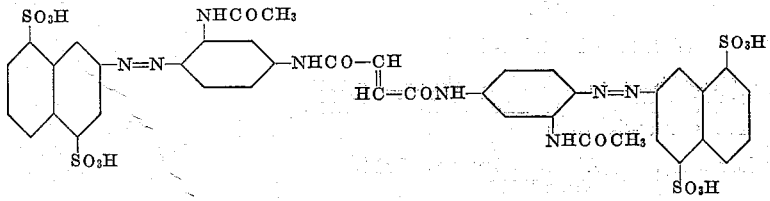

(This formula may show only the chemical combination but not the structural configuration)

and dyes cotton and regenerated cellulose in yellow shades which are of very good dischargeability and very good fastness to light.

Dyestuffs of similar properties are obtained by replacing in the starting dyestuff of this example, on the one hand the 2-aminonaphthalene-4,8-disulfonic acid by an equivalent quantity of another aminonaphthalene-disulfonic acid such, for example, as 2-aminonaphthalene-6,8-disulfonic acid or 2-aminonaphthalene-5,7-disulfonic acid, etc., and/or on the other hand replacing the 3-acetylamino-1-aminobenzene by an equivalent quantity of another amine of the benzene series, such for example as aniline, 2-amino-1-methylbenzene, 3 - amino - 1 - methylbenzene, 1-amino - 3 - ethylbenzene, 1-amino-2,5-dimethylbenzene, 1-amino-2-methoxybenzene, 1-amino-2-methoxy-5-acetylaminobenzene, 1-amino-2,5-dimethoxybenzene, 1-amino-2,5-diethoxybenzene, 1 - amino - 3 - formylaminobenzene, 1-amino-3-benzoylaminobenzene, etc., while otherwise proceeding according to the prescriptions of the example.

If, in any of the preceding indicated embodiments, the fumaric acid dichloride is replaced by fumaric acid dibromide, the identical dyestuff is produced in each case.

Example 2

475 parts of the dyestuff prepared by coupling diazotized 4 - amino-1,1'-azobenzene-3,4'-disulfonic acid with 1-amino-3-methylbenzene are dissolved in water at room temperature, sodium hydroxide solution being added to keep the dyestuff solution neutral. Into the said dyestuff solution, there are simultaneously added dropwise and while stirring thoroughly a solution of 76.5 parts of fumaric acid dichloride in 80 parts of benzene and a solution of sodium carbonate, the latter in such quantity as constantly to maintain the reaction weakly alkaline.

After all the fumaric acid dichloride has been added, the resultant solution is further stirred until no more free amino group can be detected. Thereupon the formed dyestuff is salted out while warming slightly, and the separated dyestuff filtered off and dried. The thus-obtained dyestuff is a brown-red powder which corresponds to the formula

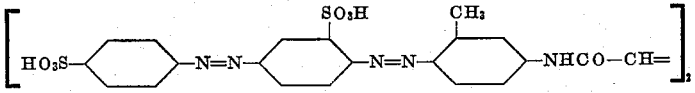

and which dyes cotton and regenerated cellulose in yellow-orange shades of very good dischargeability and fastness to light.

Dyestuffs of similar properties are obtained when, in the starting dyestuff of this example, the 1-amino-3-methylbenzene is replaced by one of the amines of the benzene series enumerated in Example 1.

By replacing the fumaric acid dichloride by an equivalent amount of maleic acid dichloride or maleic acid dibromide, and otherwise proceeding as described in the present example, cotton dyestuffs of the same properties as the initially-described dyestuff are obtained.

Example 3

569 parts of the dyestuff of the formula

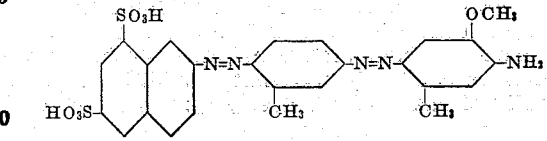

prepared by coupling diazotized 2-aminonaphthalene-6,8-disulfonic acid with 1-amino-3-methylbenzene, diazotization of the resultant aminoazo dyestuff, and coupling of the latter with 1-amino-2-methoxy-5-methylbenzene, are dissolved in water at room temperature with addition of sodium hydroxide solution to maintain neutrality. Into the thus-obtained neutral dyestuff solution, there are simultaneously added dropwise and with thorough stirring a solution of 76.5 parts of fumaric acid dichloride in 80 parts of benzene and a sufficient amount of sodium carbonate solution to keep the reaction constantly weakly alkaline.

After all the fumaric acid dichloride has been added, stirring of the solution is continued until no more free amino group can be detected. Thereupon the formed dyestuff is salted out with the aid of sodium chloride while warming slightly. The precipitated dyestuff is then filtered off and dried.

The thus-prepared dyestuff is a brown-yellow powder which corresponds to the formula

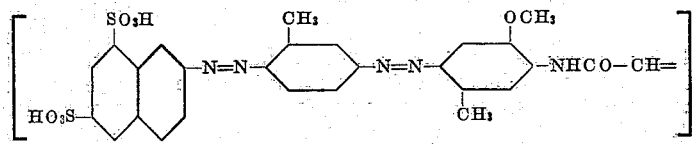

and which dyes cotton and regenerated cellulose in orange shades of very good dischargeability and fastness to light.

Dyestuffs with similar properties are obtained by replacing in the starting dyestuff of this example, on the one hand the 2-aminonaphthalene-6,8-disulfonic acid by an equivalent quantity of 2-aminophthalene-4,8-disulfonic acid or of 2-aminonaphthalene-5,7-disulfonic acid and/or on the other hand replacing the 1-amino-3-methyl-benzene and/or the 1-amino-2-methoxy-5-methylbenzene by one of the amines of the benzene series enumerated in Example 1, while otherwise proceeding according to the foregoing prescriptions of the present example.

For instance, if the dyestuff prepared by coupling 2-aminonaphthalene-6,8-disulfonic acid with aniline, diazotization of the resultant aminoazo dyestuff, and coupling of the latter with 1-amino-3-methylbenzene, is treated with fumaric acid dichloride, a condensation product is obtained which corresponds to the formula

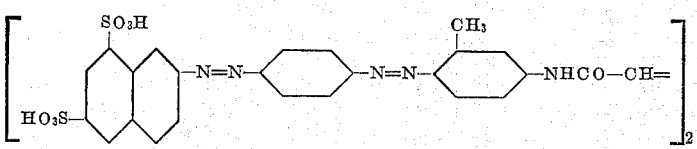

Example 4

636 parts of the dyestuff of the formula

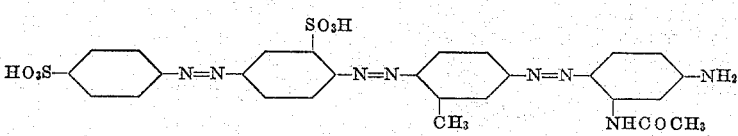

prepared by coupling diazotized 4-amino-1,1'-azobenzene-3,4'-disulfonic acid with 1-amino-3-methylbenzene, diazotizing the thus-prepared aminodisazo dyestuff and then coupling it with 1-amino-3-acetylaminobenzene, are dissolved in water at 30–40° C. while maintaining the neutrality of the resultant solution by the addition of sodium hydroxide solution. 76.5 parts of fumaric acid dichloride are then added, together with sodium carbonate. Stirring of the reaction mixture is continued until the presence of a free amino group can no longer be detected, whereupon the newly-formed dyestuff is precipitated with the aid of sodium chloride and while warming. The precipitated dyestuff is then filtered off and dried to produce a dark brown powder which corresponds to the formula

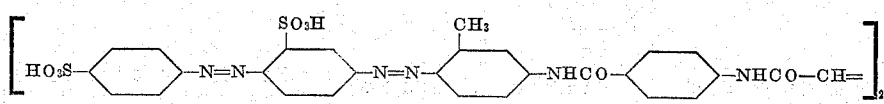

and which dyes cotton and regenerated cellulose in brown shades of good dischargeability and fastness to light.

Dyestuffs of similar properties are obtained when, in the initial dyestuff of this example, the 1-amino-3-acetylaminobenzene and/or the 1-amino-3-methylbenzene is replaced by an equivalent quantity of one of the amines of the benzene series enumerated in Example 1, and while otherwise proceeding according to the prescriptions of the present example.

Example 5

594 parts of the dyestuff of the formula

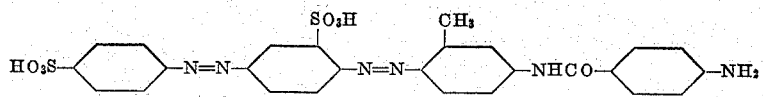

prepared by coupling diazotized 4-amino-1,1'-azobenzene-3,4'-disulfonic acid with 1-amino-3-methylbenzene, and acylating the thus-obtained aminoazo dyestuff with p-nitrobenzoyl chloride, followed by reduction of the nitro group to the amino group, are dissolved in water at room temperature, with addition of sodium hydroxide solution to keep the dyestuff solution neutral. Thereupon 76.5 parts of fumaric acid dichloride, together with sufficient sodium bicarbonate to maintain the reaction weakly alkaline, are added, and the mixture stirred until free amino groups have entirely disappeared. The newly-formed dyestuff is then precipitated with the aid of sodium chloride and while warming slightly, and the precipitated dyestuff is then filtered off and dried. The resultant yellow brown powder corresponds to the formula

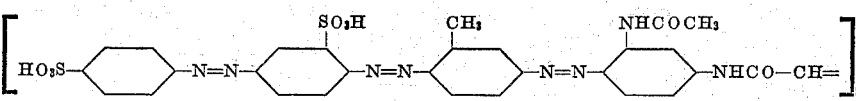

and dyes cotton and regenerated cellulose in yellow shades of good dischargeability and fastness to light.

Dyestuffs with similar properties are obtained when, in the starting dyestuff of this example, on the one hand the 4-amino-1,1'-azo-benzene-3,4'-disulfonic acid is replaced by the equivalent quantity of an aminoazo compound prepared by coupling diazotized 2-aminonaphthalene-4,8-disulfonic acid with one of the amines of the benzene series enumerated in Example 1 and/or on the other hand the 1-amino-3-methylbenzene is replaced by an equivalent quantity of one of the said amines, while otherwise adhering to the prescriptions of the present example.

The fumaric acid dichloride may, in any of the described cases, be replaced by an equivalent amount of mesaconic acid dichloride or mesaconic acid dibromide, with formation of a dyestuff of similar properties. Thus, by making this replacement in the case of the first paragraph of the present example, the obtained dyestuff will correspond to the formula

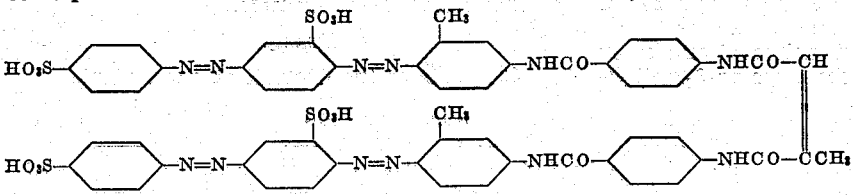

(This formula may show only the chemical combination but not the structural configuration.)

in brown shades of good dischargeability and very good light fastness.

Example 6

525 parts of the dyestuff of the formula

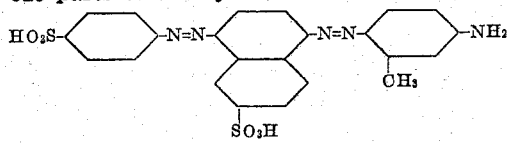

prepared by coupling diazotized 1-aminobenzene-4-sulfonic acid with 1-amino-naphthalene-6-sulfonic acid, diazotizing the obtained aminoazo dyestuff and coupling the resultant diazo compound with 1-amino-3-methylbenzene, are dissolved in water at room temperature, sodium hydroxide solution being added to maintain the neutrality of the dyestuff solution. Thereupon 76.5 parts of fumaric acid dichloride are added, together with sufficient sodium carbonate to keep the reaction weakly alkaline.

As soon as no free amino group can be detected, the newly-formed dyestuff is precipitated by means of sodium chloride and while warming, whereupon the precipitated dyestuff is filtered off and dried. In this way, the dyestuff is obtained in the form of a brown powder, which corresponds to the formula Dyestuffs with similar properties are obtained when, in the starting dyestuff of this example, on the one hand the 1-aminobenzene-4-sulfonic acid is replaced by an equivalent quantity of 1-amino-2,4-dichlorobenzene-6-sulfonic acid, 1-amino-4-bromobenzene-2-sulfonic acid, 1-amino-4-nitrobenzene-2-sulfonic acid or 1-amino-2-carboxybenzene-5-sulfonic acid, and/or on the other hand the 1-amino-3-methylbenzene is replaced by one of the amines of the benzene series enumerated in Example 1, and while otherwise adhering to the prescriptions of the present example.

Analogous dyestuffs are also obtained when, in the starting dyestuffs of this example, the 1-aminobenzene-4-sulfonic acid is, on the one hand, replaced by an equivalent quantity of 1-aminobenzene-2,5-disulfonic acid, and the 1-amino-naphthalene-6-sulfonic acid is, on the other hand, replaced by 1-aminonaphthalene.

Dyestuffs of the same properties are obtained when the fumaric acid dichloride is replaced by an equivalent quantity of maleic acid dichloride, while dyestuffs of similar properties are obtained when the fumaric acid dichloride is replaced by an equivalent quantity of citraconic acid dichloride.

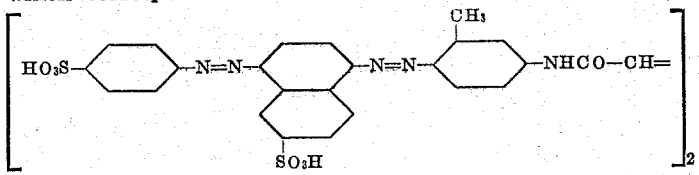

and which dyes cotton and regenerated cellulose

In this way it is possible to prepare inter alia dyestuffs which correspond to the formulae

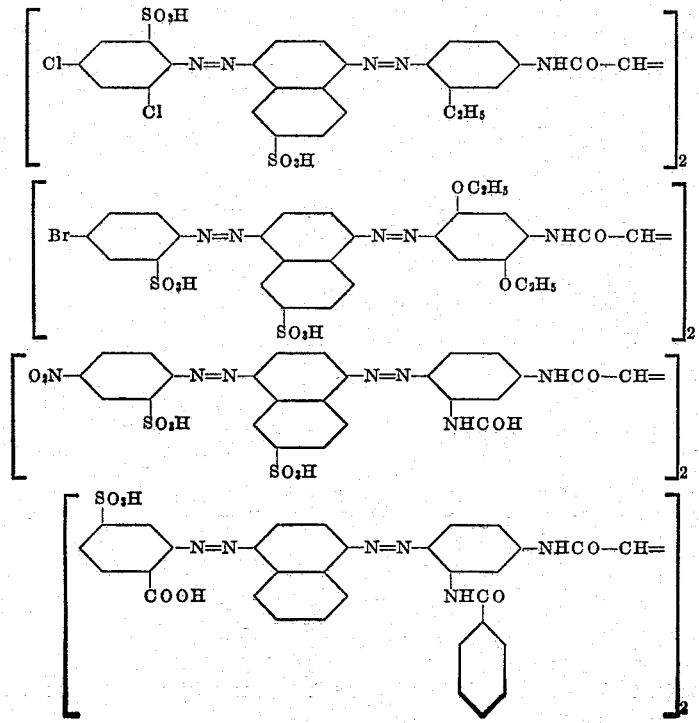

The acid-binding agent employed in the foregoing examples may be replaced, without altering results, by sodium hydroxide, sodium bicarbonate, potassium carbonate, sodium acetate, magnesium hydroxide, calcium carbonate, etc.

Having thus disclosed the invention what is claimed is:

1. A process of manufacture of a polyazo dyestuff comprising the step of condensing, in an aqueous medium and in presence of an acid-binding agent, two mols of an aminoazo dyestuff corresponding to the formula

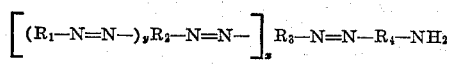

wherein each of $x$ and $y$ is one of the numerals 0 and 1, and wherein each of $R_1$, $R_2$, $R_3$ and $R_4$ stands for a radical selected from the group consisting of unsubstituted and halogen-substituted, lower alkyl substituted, lower alkoxy-substituted, acylamino-substituted and nitro-substituted radicals of the benzene and naphthalene series, such radicals possessing together at least two solubilizing groups with one mol of a dicarboxylic acid halide corresponding to the general formula $$Z-OC-CH=C-CO-Z$$
$$\quad\quad\quad\quad\quad |$$
$$\quad\quad\quad\quad\quad Y$$

wherein Y stands for a member selected from the group consisting of hydrogen and methyl, and Z stands for an atom selected from the group consisting of chlorine and bromine.

2. A process of manufacture of a polyazo dyestuff comprising the step of condensing, in an aqueous medium and in presence of an acid-binding agent, two mols of the aminoazo dyestuff corresponding to the formula

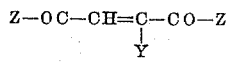

with one mol of fumaric acid dichloride.

3. A process of manufacture of a polyazo dyestuff comprising the step of condensing, in an aqueous medium and in presence of an acid-binding agent, two mols of the aminoazo dyestuff corresponding to the formula

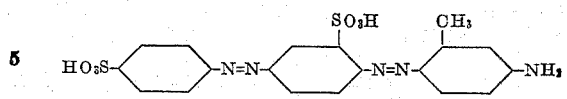

with one mol of fumaric acid dichloride.

4. A process of manufacture of a polyazo dyestuff comprising the step of condensing, in an aqueous medium and in presence of an acid-binding agent, two mols of the aminoazo dyestuff corresponding to the formula

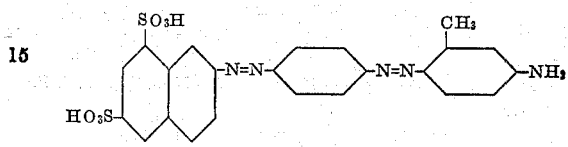

with one mol of fumaric acid dichloride.

5. A process of manufacture of a polyazo dyestuff comprising the step of condensing in an aqueous medium and in presence of an acid-binding agent, two mols of the aminoazo dyestuff corresponding to the formula

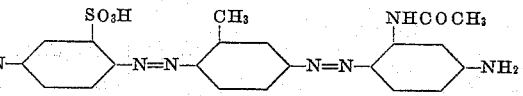

with one mol of fumaric acid dichloride.

6. A process of manufacture of a polyazo dyestuff comprising the step of condensing, in an aqueous medium and in presence of an acid-binding agent, two mols of the aminoazo dyestuff corresponding to the formula

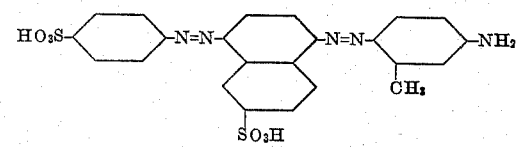

with one mol of fumaric acid dichloride.

7. A polyazo dyestuff corresponding to the formula

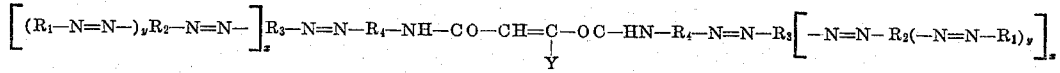

wherein each of $x$ and $y$ is one of the numerals 0 and 1, Y stands for a member selected from the group consisting of H and $CH_3$, and wherein each of $R_1$, $R_2$, $R_3$ and $R_4$ stands for a radical selected from the group consisting of unsubstituted and halogen-substituted, lower alkyl-substituted, lower alkoxy-substituted, acylamino-substituted and nitro-substituted radicals of the benzene and naphthalene series, such radicals possessing together at least two solubilizing groups.

8. The polyazo dyestuff corresponding to the formula

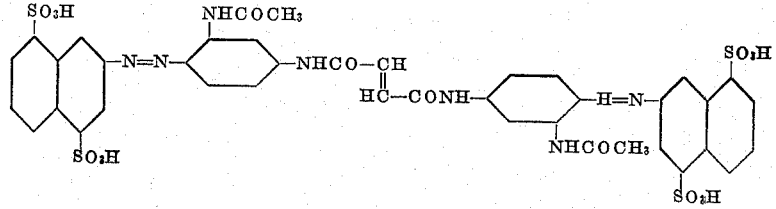

9. The polyazo dyestuff corresponding to the formula

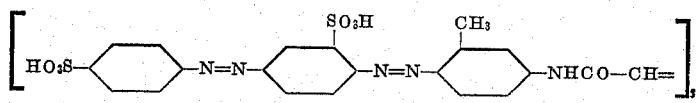

10. The polyazo dyestuff corresponding to the formula
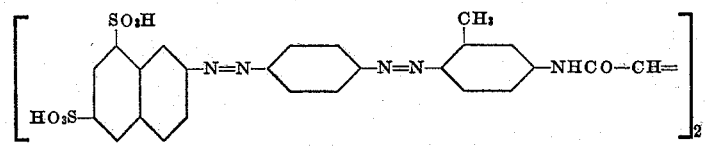
11. The polyazo dyestuff corresponding to the formula
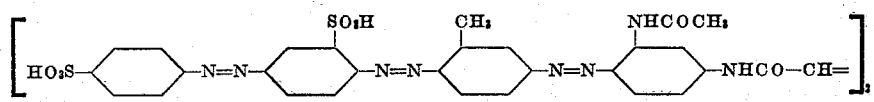
12. The polyazo dyestuff corresponding to the formula
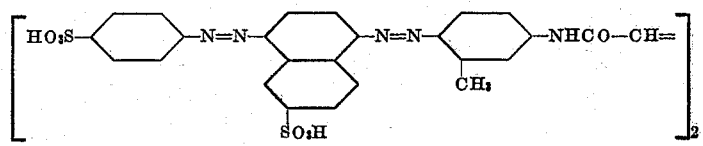
PH. GRANDJEAN.
WALTER WEHRLI.
References Cited in the file of this patent
UNITED STATES PATENTS
| Number | Name | Date |
|---|---|---|
| 1,940,683 | Jordan | Dec. 26, 1933 |
| 2,104,595 | Schirm | Jan. 4, 1938 |